United States Patent
Yang et al.

(10) Patent No.: US 10,320,673 B2
(45) Date of Patent: Jun. 11, 2019

(54) FLOW TABLE GENERATING METHOD AND APPARATUS

(71) Applicant: HUAWEI TECHNOLOGIES CO., LTD., Shenzhen (CN)

(72) Inventors: Xuejiao Yang, Shenzhen (CN); Pengcheng Tang, Shanghai (CN); Hongbo Tian, Shanghai (CN); Yan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 15/174,547

(22) Filed: Jun. 6, 2016

(65) Prior Publication Data

US 2016/0285764 A1 Sep. 29, 2016

Related U.S. Application Data

(63) Continuation of application No. PCT/CN2013/088999, filed on Dec. 10, 2013.

(51) Int. Cl.
*H04L 12/741* (2013.01)
*H04L 29/08* (2006.01)
(Continued)

(52) U.S. Cl.
CPC .......... *H04L 45/745* (2013.01); *H04L 41/12* (2013.01); *H04L 41/5054* (2013.01);
(Continued)

(58) Field of Classification Search
CPC combination set(s) only.
See application file for complete search history.

(56) References Cited

U.S. PATENT DOCUMENTS

2012/0314584 A1 12/2012 Su
2013/0272305 A1 10/2013 Lefebvre et al.
(Continued)

FOREIGN PATENT DOCUMENTS

CN 101247337 A 8/2008
CN 101282500 A 10/2008
(Continued)

OTHER PUBLICATIONS

Qazi et al., "SIMPLE_fying Middlebox Policy Enforcement Using SDN", SIGCOMM, ACM, Aug. 27, 2013, New York, New York, USA, pp. 27-38.
(Continued)

*Primary Examiner* — Kodzovi Acolatse
*Assistant Examiner* — The Hy Nguyen
(74) *Attorney, Agent, or Firm* — Staas & Halsey LLP

(57) ABSTRACT

The present invention discloses a flow table generating method and apparatus. The method includes: obtaining, by an SDN controller, a user data packet processing manner of a VAS server that is sent by a VAS server information collector; generating a flow table according to service chain information of a user data packet, the user data packet processing manner of the VAS server, and a 5-tuple of the user data packet; and sending the flow table to an SDN switch, so that the SDN switch can send the user data packet to a corresponding VAS server according to the flow table, thereby implementing access of the user data packet to a related VAS server in a case in which a VAS server modifies a 5-tuple of a user data packet.

16 Claims, 9 Drawing Sheets

(51) Int. Cl.
    *H04L 12/721* (2013.01)
    *H04L 12/24* (2006.01)
(52) U.S. Cl.
    CPC .............. *H04L 45/38* (2013.01); *H04L 45/54* (2013.01); *H04L 67/00* (2013.01); *H04L 67/10* (2013.01)

(56) References Cited

U.S. PATENT DOCUMENTS

| | | | | |
|---|---|---|---|---|
| 2013/0329734 | A1* | 12/2013 | Chesla | H04L 45/74 370/392 |
| 2014/0365680 | A1* | 12/2014 | van Bemmel | H04L 29/06 709/232 |
| 2015/0012621 | A1* | 1/2015 | Patwardhan | H04L 41/0803 709/220 |
| 2016/0308787 | A1* | 10/2016 | Ahn | H04L 49/00 |

FOREIGN PATENT DOCUMENTS

| | | |
|---|---|---|
| CN | 101790005 A | 7/2010 |
| CN | 101951604 A | 1/2011 |
| CN | 102217281 A | 10/2011 |
| EP | 2 538 708 A1 | 12/2012 |
| WO | 2011/031240 A1 | 3/2011 |

OTHER PUBLICATIONS

Zhang et al., "StEERING: A Software-Defined Networking for Inline Service Chaining", 21st IEEE International Conference on Network Protocols (ICNP), IEEE, Oct. 7, 2013, pp. 1-10.
International Search Report and Written Opinion dated Jul. 7, 2014 in corresponding International Patent Application No. PCT/CN2013/088999.
Extended European Search Report dated Oct. 31, 2016 in corresponding European Patent Application No. 13898977.7.
International Search Report dated Jul. 7, 2016 in corresponding International Application No. PCT/CN2013/088999.

* cited by examiner

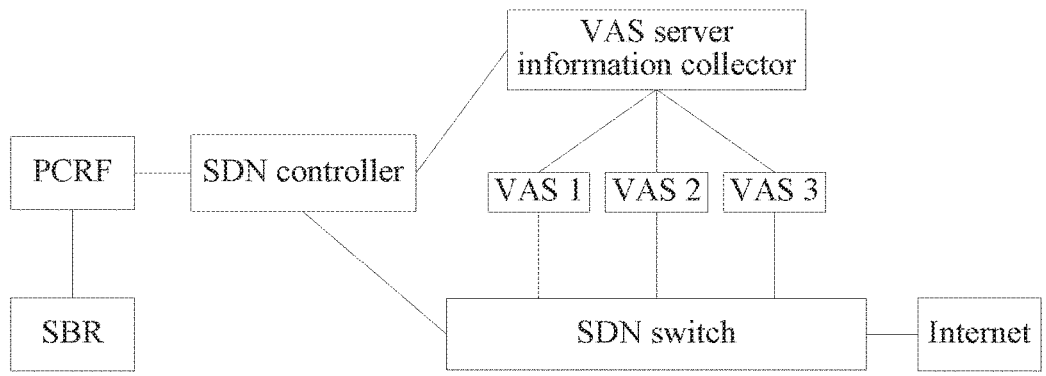

FIG. 1

```
┌─────────────────────────────────────────────────────────┐
│ A software defined network SDN controller obtains VAS   │
│ server information sent by a value added service VAS    │── 201
│ server information collector, where the VAS server      │
│ information includes a VAS server identifier and a user │
│ data packet processing manner of a VAS server           │
└─────────────────────────────────────────────────────────┘
                            │
┌─────────────────────────────────────────────────────────┐
│ The SDN controller receives a 5-tuple of a user data    │
│ packet and service chain information that are sent by a │── 202
│ service-based router SBR, where the service chain       │
│ information includes an identifier of a VAS server in   │
│ the service chain                                       │
└─────────────────────────────────────────────────────────┘
                            │
┌─────────────────────────────────────────────────────────┐
│ The SDN controller queries the VAS server information   │── 203
│ according to the identifier of the VAS server to obtain │
│ VAS server information of the VAS server in the service │
│ chain                                                   │
└─────────────────────────────────────────────────────────┘
                            │
┌─────────────────────────────────────────────────────────┐
│ The SDN controller generates a flow table according to  │
│ a user data packet processing manner of the VAS server  │── 204
│ in the service chain, the 5-tuple of the user data      │
│ packet, and the service chain information; and sends    │
│ the flow table to an SDN switch                         │
└─────────────────────────────────────────────────────────┘
```

FIG. 2

FLOW TABLE GENERATING METHOD AND APPARATUS

CROSS REFERENCE

This application is a continuation of International Application No. PCT/CN2013/088999 filed on Dec. 10, 2013 which is incorporated herein by references in its entirety.

TECHNICAL FIELD

The present invention relates to communications technologies, and in particular, to a flow table generating method and apparatus.

BACKGROUND

To fully tap potential of mobile networks and meet various increasing user demands, mobile operators deploy value-added services in a manner in which a universal gateway (UGW) connects various value-added service (VAS) servers in series. The VAS servers include a video optimizer, a service stream compressor, a data buffer, a deep packet inspector, a Hypertext Transfer Protocol (HTTP) header enhancer, and the like; and are configured to provide various value-added services for a user.

In the prior art, a process in which a user data packet obtains a value-added service provided by a VAS server is as follows: a software defined network (SDN) controller generates a flow table according to a 5-tuple of a user data packet and service chain information of the user data packet that are sent by a service-based router (SBR), and sends the flow table to an SDN switch, where the flow table includes more than one flow table entry, a flow table entry further includes a match entry and an execution entry, the match entry is the 5-tuple of the user data packet, and the execution entry is to access a specific VAS server; after receiving the user data packet, the SDN switch obtains the 5-tuple of the user data packet and matches the 5-tuple with the match entry of the previously received flow table, where if the match entry of the flow table is the same as the 5-tuple of the user data packet, the flow table is a flow table of the user data packet, and the SDN switch sends the user data packet to a specific VAS server to perform access according to the execution entry of the flow table; and after the user data packet is returned to the SDN switch after being processed by the VAS server, the SDN switch still matches the 5-tuple of the received user data packet with the match entry of the flow table, and sends the user data packet to a next VAS server according to a matched flow table.

However, if the VAS server providing a value-added service modifies the 5-tuple of the user data packet when processing the user data packet, for example, a VAS server providing network address translation or an HTTP proxy service modifies a 5-tuple of a user data packet, after the user data packet is processed by the VAS server, the 5-tuple of the user data packet is already modified; after the user data packet is returned to the SDN switch, because the flow table in the SDN switch is the flow table generated by the SDN controller according to 5-tuple information of the user data packet and service chain information of the user data packet that are sent by the SBR, the SDN switch cannot perform match according to a 5-tuple of the returned user data packet and the match entry in the previously received flow table, cannot determine a flow table of the user data packet, and cannot send the user data packet to a next VAS server. That is, in the prior art, in a case in which a VAS server modifying a 5-tuple of a user data packet exists, the SDN switch cannot determine a flow table, and therefore cannot send the user data packet to a subsequent related VAS server or another destination according to the flow table, that is, a value-added VAS service cannot be implemented in a case in which a VAS server modifies a 5-tuple of a user data packet.

SUMMARY

Embodiments of the present invention provide a flow table generating method and apparatus, so that a value-added VAS service can be implemented in a case in which a VAS service modifies a 5-tuple of a user data packet.

According to a first aspect, a flow table generating method is provided, including: obtaining, by a software defined network SDN controller, VAS server information sent by a value-added service VAS server information collector, where the VAS server information includes a VAS server identifier and a user data packet processing manner of a VAS server; receiving, by the SDN controller, a 5-tuple of a user data packet and service chain information that are sent by a service-based router SBR, where the service chain information includes an identifier of a VAS server in the service chain; querying, by the SDN controller, the VAS server information according to the identifier of the VAS server to obtain VAS server information of the VAS server in the service chain; and generating, by the SDN controller, a flow table according to a user data packet processing manner of the VAS server in the service chain, the 5-tuple of the user data packet, and the service chain information; and sending the flow table to an SDN switch.

With reference to the first aspect, in a first possible implementation manner, the generating, by the SDN controller, a flow table according to a user data packet processing manner of the VAS server in the service chain, the 5-tuple of the user data packet, and the service chain information includes: determining, by the SDN controller according to the user data packet processing manner of the VAS server in the service chain, that a first VAS server of VAS servers in the service chain modifies the 5-tuple of the user data packet and performs the modification with a rule; obtaining, by the SDN controller according to the 5-tuple of the user data packet and a user data packet processing manner of the VAS server, a 5-tuple that is modified by the first VAS server; and generating, by the SDN controller, the flow table according to the 5-tuple of the user data packet, the 5-tuple that is modified by the first VAS server, and the service chain information, where after the first VAS server, a match domain of the flow table is generated by the SDN controller according to the 5-tuple that is modified by the first VAS server.

With reference to the first aspect, in a second possible implementation manner, the generating, by the SDN controller, a flow table according to a user data packet processing manner of the VAS server in the service chain, the 5-tuple of the user data packet, and the service chain information includes: determining, by the SDN controller according to the user data packet processing manner of the VAS server in the service chain, that a first VAS server modifying the 5-tuple of the user data packet and performing the modification without any rule exists in the service chain; adjusting, by the SDN controller, the first VAS server modifying the user data packet without any rule to an end of the service chain, and obtaining a media access control MAC address of the first VAS server; and generating, by the SDN controller, the flow table according to the 5-tuple of the user data packet, the MAC address of the first VAS server, and the service chain information, where after the first VAS server, a match domain of the flow table is generated by the SDN controller according to the MAC address of the first VAS server.

With reference to the second possible implementation manner of the first aspect, in a third possible implementation manner, the VAS server information further includes a MAC address of the VAS server and a number of an inbound port on an SDN switch connected to the VAS server, and the obtaining, by the SDN controller, a MAC address of the first VAS server includes: obtaining, by the SDN controller, the MAC address of the first VAS server from the VAS server information obtained by query.

With reference to the second possible implementation manner of the first aspect, in a fourth possible implementation manner, the obtaining, by the SDN controller, a MAC address of the first VAS server includes: querying, by the SDN controller according to an identifier of the first VAS server, a database to obtain the MAC address of the first VAS server.

With reference to the first aspect, in a fifth possible implementation manner, the generating, by the SDN controller, a flow table according to a user data packet processing manner of the VAS server in the service chain, the 5-tuple of the user data packet, and the service chain information includes: determining, by the SDN controller according to the user data packet processing manner of the VAS server in the service chain, that no VAS server modifying the 5-tuple of the user data packet exists in the service chain; and generating, by the SDN controller, the flow table according to the 5-tuple of the user data packet and the service chain information.

With reference to the first aspect, or the first to fifth possible implementation manners of the first aspect, in a sixth possible implementation manner, the obtaining, by an SDN controller, a user data packet processing manner of a VAS server that is sent by a VAS server information collector includes: sending, by the SDN controller, an identifier of an SDN switch connected to the SDN controller to the VAS server information collector to request to obtain information about a VAS server connected to the SDN switch; and obtaining, by the SDN controller, the information, about the VAS server connected to the SDN switch, that is sent by the VAS server information collector according to the identifier of the SDN switch.

According to a second aspect, another flow table generating method is provided, including: receiving, by a VAS server information collector, VAS server information reported by a VAS server, where the VAS server information includes a VAS server identifier, an identifier of an SDN switch connected to the VAS server, and a user data packet processing manner of the VAS server; receiving, by the VAS server information collector, request information sent by an SDN controller to request to obtain information about a VAS server connected to an SDN switch that is connected to the SDN controller, where the request information includes an identifier of the SDN switch connected to the SDN controller; and querying, by the VAS server information collector, the VAS server information according to the identifier of the SDN switch to obtain a VAS server identifier of the VAS server connected to the SDN switch and a user data packet processing manner of the VAS server; and sending the VAS server identifier of the VAS server connected to the SDN switch and the user data packet processing manner of the VAS server to the SDN controller, so that the SDN controller generates a flow table and sends the flow table to the SDN switch.

According to a third aspect, a flow table generating apparatus is provided, including: an obtaining unit, configured to obtain VAS server information sent by a value-added service VAS server information collector, where the VAS server information includes a VAS server identifier and a user data packet processing manner of a VAS server; and obtain a 5-tuple of a user data packet and service chain information that are sent by a service-based router SBR, where the service chain information includes an identifier of a VAS server in the service chain;

a query unit, configured to query the VAS server information according to the identifier of the VAS server to obtain VAS server information of the VAS server in the service chain; a processing unit, configured to generate a flow table according to a user data packet processing manner of the VAS server in the service chain, the 5-tuple of the user data packet, and the service chain information; and a sending unit, configured to send the flow table to an SDN switch.

With reference to the third aspect, in a first possible implementation manner, the processing unit specifically includes: a determining subunit, configured to determine, according to the user data packet processing manner of the VAS server in the service chain, that a first VAS server of VAS servers in the service chain modifies the 5-tuple of the user data packet and performs the modification with a rule; an obtaining subunit, configured to obtain, according to the 5-tuple of the user data packet and a user data packet processing manner of the VAS server, a 5-tuple that is modified by the first VAS server; and a generating subunit, configured to generate the flow table according to the 5-tuple of the user data packet, the 5-tuple that is modified by the first VAS server, and the service chain information, where a match domain of the flow table is generated by the processing unit according to the 5-tuple that is modified by the first VAS server after the first VAS server modifies the 5-tuple of the user data packet.

With reference to the third aspect, in a second possible implementation manner, the processing unit specifically includes: a determining subunit, configured to determine, according to the user data packet processing manner of the VAS server in the service chain, that a first VAS server modifying the 5-tuple of the user data packet and performing the modification without any rule exists in the service chain; an obtaining subunit, configured to obtain a media access control MAC address of the first VAS server; and a generating subunit, configured to adjust the first VAS server modifying the user data packet without any rule to an end of the service chain, and generate the flow table according to the 5-tuple of the user data packet, the MAC address of the first VAS server, and the service chain information, where after the first VAS server, a match domain of the flow table is generated by the processing unit according to the MAC address of the first VAS server.

With reference to the second possible implementation manner of the third aspect, in a third possible implementation manner, the processing unit specifically includes: a determining subunit, configured to determine, according to the user data packet processing manner of the VAS server in the service chain, that a first VAS server modifying the 5-tuple of the user data packet and performing the modification without any rule exists in the service chain; an obtaining subunit, configured to obtain a media access control MAC address of the first VAS server; and a generating subunit, configured to adjust the first VAS server modifying the user data packet without any rule to an end of the service chain, and generate the flow table according to the 5-tuple of the user data packet, the MAC address of the first VAS server, and the service chain information, where after the first VAS server, a match domain of the flow table is generated by the processing unit according to the MAC address of the first VAS server.

With reference to the second possible implementation manner of the third aspect, in a fourth possible implementation manner, the obtaining subunit is further configured to query, according to an identifier of the first VAS server, a database to obtain the MAC address of the first VAS server.

With reference to the third aspect, in a fifth possible implementation manner, the processing unit specifically includes: a determining subunit, configured to determine, according to the user data packet processing manner of the VAS server in the service chain, that no VAS server modifying the 5-tuple of the user data packet exists in the service chain; and a generating subunit, generating the flow table according to the 5-tuple of the user data packet and the service chain information.

With reference to the third aspect, or any one of the first to fifth possible implementation manners of the third aspect, in a sixth possible implementation manner, the sending unit is further configured to send an identifier of an SDN switch connected to the apparatus to the VAS server information collector to request to obtain information about a VAS server connected to the SDN switch; and that the obtaining unit is configured to obtain a user data packet processing manner of the VAS server sent by the VAS server information collector is specifically that: the obtaining unit is configured to obtain the information, about the VAS server connected to the SDN switch, that is sent by the VAS server information collector according to the identifier of the SDN switch.

According to a fourth aspect, another flow table generating apparatus is provided, including: a receiving unit, configured to receive VAS server information reported by a VAS server, where the VAS server information includes a VAS server identifier, an identifier of a SDN switch connected to the VAS server, and a user data packet processing manner of the VAS server; and receive request information sent by an SDN controller to request to obtain information about a VAS server connected to an SDN switch that is connected to the SDN controller, where the request information includes an identifier of the SDN switch connected to the SDN controller; a processing unit, configured to query the VAS server information according to the identifier of the SDN switch to obtain the information about the VAS server connected to the SDN switch that is connected to the SDN controller; and a sending unit, configured to send the information about the VAS server connected to the SDN switch that is connected to the SDN controller to the SDN controller, so that the SDN controller generates a flow table and sends the flow table to the SDN switch.

Based on the flow table generating method and apparatus provided in the embodiments of the present invention in the foregoing technical solutions, because an SDN controller obtains a user data packet processing manner of a VAS server; generates a flow table according to service chain information of a user data packet, the user data packet processing manner of the VAS server in a service chain, and a 5-tuple of the user data packet, that is, the flow table is generated with reference to a manner of modifying, by a VAS server, the 5-tuple; and sends the flow table to an SDN switch, the SDN switch performs service routing on the user data packet according to the flow table, the user data packet returned subsequently after the VAS server modifies the 5-tuple of the user data packet can still match the flow table, and a value-added VAS service can be implemented in a case in which a VAS server modifies a 5-tuple of a user data packet.

BRIEF DESCRIPTION OF DRAWINGS

To describe the technical solutions in the embodiments of the present invention more clearly, the following briefly introduces the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of a network architecture according to an embodiment of the present invention;

FIG. 2 is a schematic flowchart of a flow table generating method according to an embodiment of the present invention:

DESCRIPTION OF EMBODIMENTS

Figure 3:
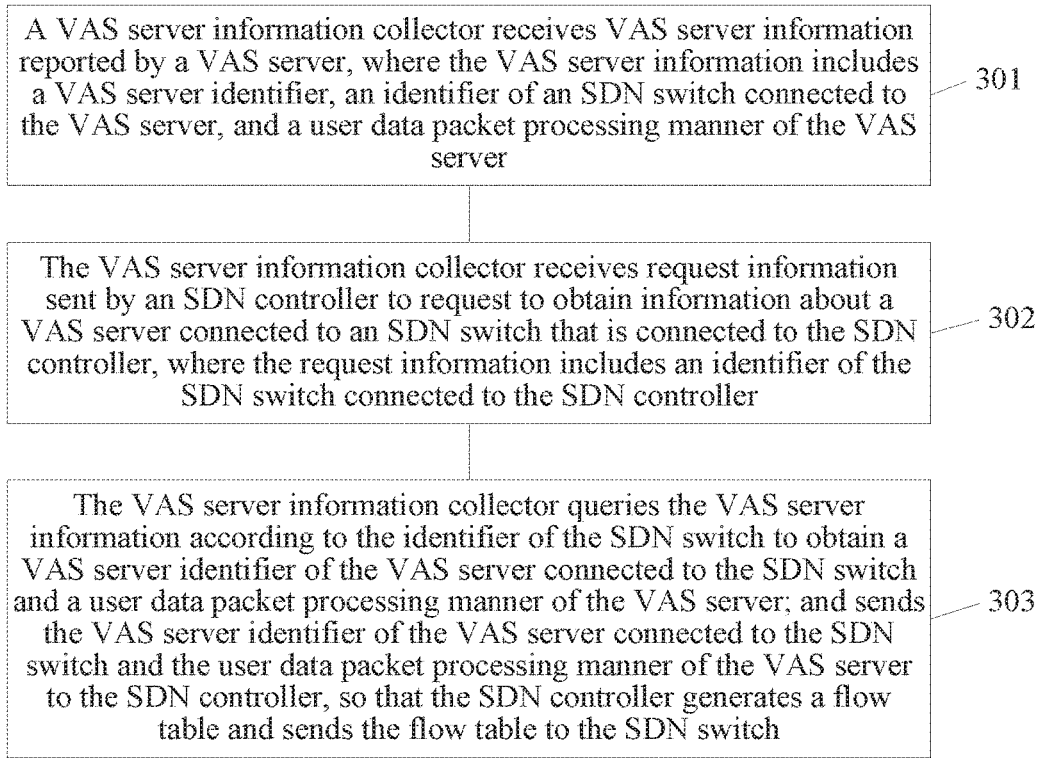
FIG. 3 is a schematic flowchart of another flow table generating method according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), or a Worldwide Interoperability for Microwave Access (WiMAX) communications system.

FIG. 1 is a schematic diagram of a network architecture on which the embodiments of the present invention are based. It should be understood that the network architecture shown in FIG. 1 is an exemplary application architecture of the embodiments of the present invention, but the embodiments of the present invention may also be based on other network architectures, which is not limited in the embodiments of the present invention.

As shown in FIG. 1, in the diagram of the network architecture including a service-based router (SBR), a policy and charging rule function (PCRF), an SDN controller, a VAS server information collector, and an SDN switch, the SBR is mainly configured to extract a 5-tuple of a user data packet and service chain information of the user data packet, and send the 5-tuple of the user data packet and the service chain information of the user data packet to the SDN controller. The SDN controller is mainly configured to generate a flow table. In the prior art, the SDN controller is mainly configured to generate a flow table according to the 5-tuple of the user data packet and the service chain information of the user data packet that are sent by the SBR, and send the flow table to the SDN switch, and in the embodiments of the present invention, the SDN controller may be configured to generate a flow table according to the service chain information of the user data packet, a user data packet processing manner of a VAS server in the service chain, and the 5-tuple of the user data packet, and send the flow table to the SDN switch; and the SDN switch is mainly configured to send a user data packet to a corresponding VAS server according to a flow table, so that the user data packet can access the corresponding VAS server, so as to obtain a value-added service provided by the VAS server.

In the embodiments of the present invention, to enable the SDN controller to obtain a user data packet processing manner of a VAS server in VAS server information, a logical network node, that is, the VAS server information collector, is independently deployed in a network. The VAS information collector is configured to collect the VAS server information after a VAS server joins the network. Before generating a flow table, the SDN controller sends a query request to the VAS information collector to request to obtain the user data packet processing manner of the VAS server in the VAS server information, so as to generate the flow table.

FIG. 2 is a schematic flowchart of a flow table generating method according to an embodiment of the present invention. The method may be executed by any proper apparatus, for example, an SDN controller, but this embodiment of the present invention is not limited thereto.

S201: A software defined network SDN controller obtains VAS server information sent by a value-added service VAS server information collector, where the VAS server information includes a VAS server identifier and a user data packet processing manner of a VAS server.

The VAS server identifier is used for identifying a specific VAS server, and may be a sequence number, an identification number, or the like of a VAS server. The user data packet processing manner of the VAS server specifically includes whether the VAS server modifies a 5-tuple of a user data packet, and whether the 5-tuple of the user data packet is modified with a rule. Whether the 5-tuple of the user data packet is modified with a rule is determined based on whether the 5-tuple (5 tupple) of the user data packet before modification by the VAS server can be determined according to a 5-tuple (5-tupple') of the user data packet after modification by the VAS server; and if the 5-tuple of the user data packet before modification by the VAS server can be determined, a rule exists, and if the 5-tuple of the user data packet before modification by the VAS server cannot be determined, no rule exists. A specific manner for representing the user data packet processing manner of the VAS server may be a calculation manner, for example, a function: 5-tupple'=F(5 tupple). For details, reference may be made to a related description of S504 in an embodiment of the present invention shown in FIG. 5 and a related description of S704 in an embodiment of the present invention shown in FIG. 7.

S202: The SDN controller receives a 5-tuple of a user data packet and service chain information that are sent by a service-based router SBR, where the service chain information includes an identifier of a VAS server in the service chain.

S203: The SDN controller queries the VAS server information according to the identifier of the VAS server to obtain VAS server information of the VAS server in the service chain.

S204: The SDN controller generates a flow table according to a user data packet processing manner of the VAS server in the service chain, the 5-tuple of the user data packet, and the service chain information; and sends the flow table to an SDN switch.

In an embodiment of the present invention, S204 specifically includes: determining, by the SDN controller according to the user data packet processing manner of the VAS server in the service chain, that a first VAS server of VAS servers in the service chain modifies the 5-tuple of the user data packet and performs the modification with a rule; obtaining, by the SDN controller according to the 5-tuple of the user data packet and a user data packet processing manner of the VAS server, a 5-tuple that is modified by the first VAS server; and generating, by the SDN controller, the flow table according to the 5-tuple of the user data packet, the 5-tuple that is modified by the first VAS server, and the service chain information, where after the first VAS server, a match domain of the flow table is generated by the SDN controller according to the 5-tuple that is modified by the first VAS server. In this embodiment of the present invention and other embodiments of the present invention, the first VAS server is a VAS server modifying the 5-tuple of the user data packet, and there may be one or more first VAS servers, which is not limited in the present invention.

In a case in which there is one first VAS server, the following example is used: in this embodiment of the present invention, before the first VAS server modifies the 5-tuple of the user data packet, a match domain of the flow table is generated by the SDN controller according to the 5-tuple before the first VAS server modifies the 5-tuple of the user data packet. If the SDN controller determines, according to the user data packet processing manner of the VAS server in the service chain, that a VAS server a modifying the 5-tuple of the user data packet exists in the service chain, and no VAS server modifies the 5-tuple of the user data packet before the VAS server a, before the VAS server a modifies the 5-tuple of the user data packet, a match domain of the flow table is generated by the SDN controller according to the original 5-tuple of the user data packet, where the original 5-tuple is the 5-tuple before the user data packet is sent to any VAS server; and after the VAS server a modifies the 5-tuple of the user data packet, a match domain of the flow table is generated by the SDN controller according to a 5-tuple obtained after the VAS server a modifies the 5-tuple of the user data packet.

In a case in which there are multiple first VAS servers, the following example is used: For example, if the SDN controller determines, according to the user data packet processing manner of the VAS server in the service chain, that a VAS server a and a VAS server b modifying the 5-tuple of the user data packet exist in the service chain and modify the 5-tuple with a rule, and if no other VAS server modifies the 5-tuple of the user data packet before the VAS server a, before the VAS server a modifies the 5-tuple of the user data packet, a match domain of the flow table is generated by the SDN controller according to the original 5-tuple of the user data packet; after the VAS server a modifies the 5-tuple of the user data packet and before the VAS server b modifies the 5-tuple of the user data packet, a match domain of the flow table is generated by the SDN controller according to a 5-tuple of the user data packet obtained after the modification by the VAS server a; and after the VAS server b modifies the 5-tuple of the user data packet, a match domain of the flow table is generated by the SDN controller according to a 5-tuple of the user data packet obtained after the modification by the VAS server b. That is, if the SDN controller determines, according to the user data packet processing manner of the VAS server in the service chain, that multiple VAS servers modifying the 5-tuple exist in the service chain, and perform the modification with a rule, a flow table may also be generated according to the case in the foregoing example, which is not described again in the present invention.

Figure 7:
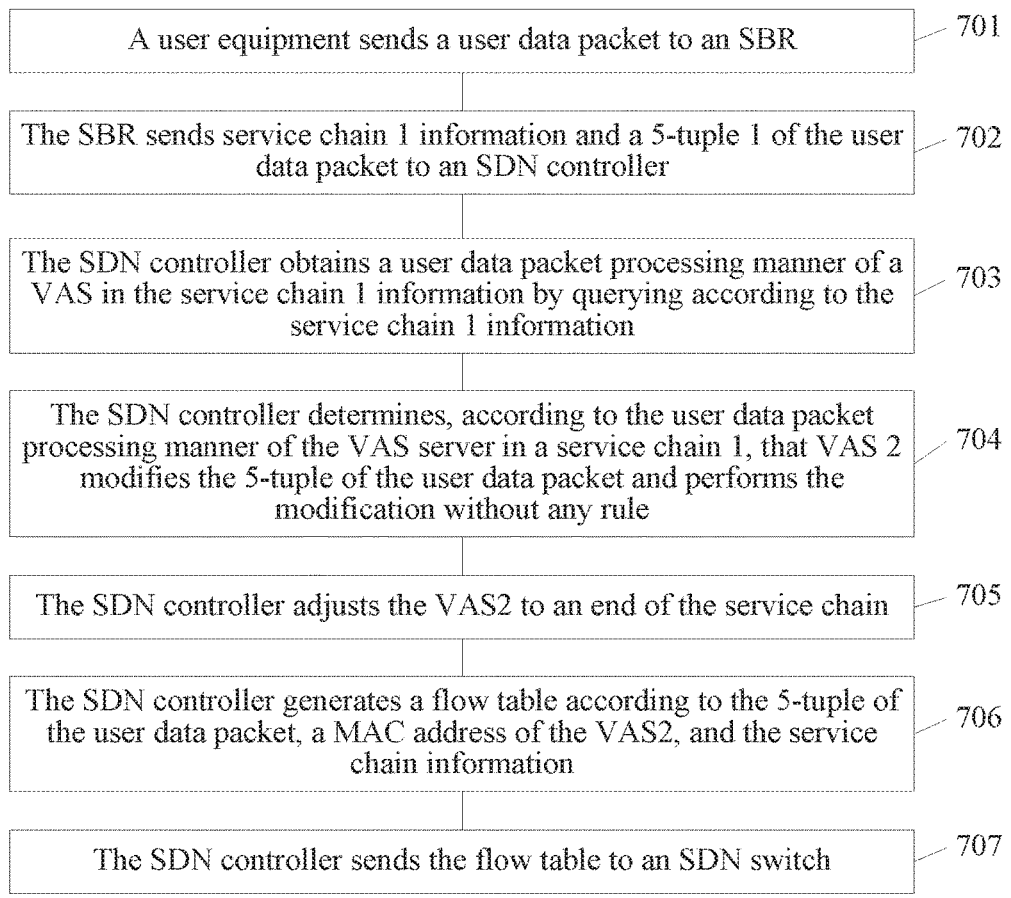
FIG. 7 is a schematic flowchart of another flow table generating method according to an embodiment of the present invention.

In another embodiment of the present invention, S204 specifically includes: determining, by the SDN controller according to the user data packet processing manner of the VAS server in the service chain, that a first VAS server modifying the 5-tuple of the user data packet and performing the modification without any rule exists in the service chain, where that a VAS server modifies the 5-tuple of the user data packet without any rule is specifically that the 5-tuple before modification cannot be determined according to a 5-tuple that is modified by the VAS server, and for details, reference may be made to a related description of S704 in an embodiment of the present invention shown in FIG. 7; and adjusting, by the SDN controller, the first VAS server modifying the user data packet without any rule to an end of the service chain, and obtaining a media access control MAC address of the first VAS server; and generating, by the SDN controller, the flow table according to the 5-tuple of the user data packet, the MAC address of the first VAS server, and the service chain information, where after the first VAS server, a match domain of the flow table is generated by the SDN controller according to the MAC address of the first VAS server. In this embodiment of the present invention and other embodiments of the present invention, the first VAS server is a VAS server modifying the 5-tuple of the user data packet, and there may be one or more first VAS servers.

In a case in which there is one first VAS server, the following example is used: If the SDN controller determines, according to the user data packet processing manner of the VAS server in the service chain, that a VAS server a modifying the 5-tuple of the user data packet and performing the modification without any rule exists in the service chain, the SDN controller adjusts the VAS server a to the end of the service chain, and obtains a MAC address of the VAS server a; and the SDN controller generates the flow table according to the 5-tuple of the user data packet, the MAC address of the VAS server a, and the service chain information, where before the VAS server a modifies the user data packet, a match domain of the flow table is generated by the SDN controller according to the 5-tuple of the user data packet; and after the VAS server a modifies the user data packet, a match domain of the flow table is generated by the SDN controller according to the MAC address of the VAS server a. After the user data packet is returned from the VAS server a to the SDN switch, the SDN switch matches a match entry of the flow table and sends the user data packet to the Internet.

In a case in which there are multiple first VAS servers, the following example is used: If the SDN controller determines, according to the user data packet processing manner of the VAS server in the service chain, that a VAS server a and a VAS b modifying the 5-tuple of the user data packet and performing the modification without any rule exist in the service chain, the SDN controller adjusts the VAS server a and the VAS server b to the end of the service chain (during initial configuration of the VAS server a and the VAS server b, an operator configures the VAS server a and the VAS server b to a same service chain, which can ensure that this adjustment can be made), and the SDN controller generates the flow table according to the 5-tuple of the user data packet, MAC addresses of the VAS servers, and the service chain information. Specifically, before the VAS server a modifies the 5-tuple of the user data packet, a match entry of the flow table is generated by the SDN controller according to the 5-tuple of the user data packet; after the VAS server a modifies the 5-tuple of the user data packet and before the VAS server b modifies the 5-tuple of the user data packet, a match entry of the flow table is generated by the SDN controller according to a MAC address of the VAS server a; and after the VAS server b modifies the 5-tuple of the user data packet, the flow table is generated by the SDN controller according to a MAC address of the VAS server b. After the user data packet is returned from the VAS server b to the SDN switch, the SDN switch matches a match entry of the flow table and sends the user data packet to the Internet. If the SDN controller determines that there are multiple VAS servers modifying the 5-tuple of the user data packet and performing the modification without any rule, a flow table may be generated according to the foregoing example, which is not described again herein in the present invention.

In this embodiment, the SDN controller obtains the MAC address of the first VAS server mainly in two manners: In one manner, the VAS server information that is obtained by the SDN controller and sent by the VAS server information collector in S201 further includes a MAC address of a VAS server, so that the SDN controller can obtain the MAC address of the first VAS server from the VAS server information obtained by query in S203. In the other manner, the SDN controller queries, according to an identifier of the first VAS server, a database to obtain the MAC address of the first VAS server, where the database is a database of the SDN controller or an extraneous database, which is not described in detail in the present invention. In the prior art, during link discovery, the SDN controller may obtain information about a VAS server connected to an SDN switch that is connected to the SDN controller, and store the information in the database of the SDN controller, where the VAS server information includes a VAS server identifier and a MAC address of a VAS server; and the SDN controller may query, according to an identifier of the first VAS server, the database to obtain the MAC address of the first VAS server.

In still another embodiment of the present invention, the manner of modifying, by a VAS, a 5-tuple with a rule and the manner of modifying, by a VAS, a 5-tuple without any rule may be combined. That is, if the SDN controller determines, according to the user data packet processing manner of the VAS server in the service chain, that a VAS server a modifying the 5-tuple of the user data packet and performing the modification with a rule, and a VAS server b modifying the 5-tuple of the user data packet and performing the modification without any rule exist in the VAS servers in the service chain, the SDN controller adjusts the VAS server b to the end of the service chain. When the SDN controller generates the flow table, after the VAS server a, a match domain of the flow table is generated by the SDN controller according to a 5-tuple that is modified by the VAS server a, and after the VAS server b, a match domain of the flow table is generated by the SDN controller according to a MAC address of the VAS server b. Further, if multiple VAS servers modifying a 5-tuple with a rule and multiple VAS servers modifying a 5-tuple without any rule exist in a same service chain, reference may be made to related steps in the foregoing embodiment of the present invention.

In still another embodiment of the present invention, S204 specifically includes determining, by the SDN controller according to the user data packet processing manner of the VAS server in the service chain, that no VAS server modifying the 5-tuple of the user data packet exists in the service chain; and generating, by the SDN controller, the flow table according to the 5-tuple of the user data packet and the service chain information.

In still another embodiment of the present invention, the obtaining, by an SDN controller, a user data packet processing manner of a VAS server that is sent by a VAS server information collector in S201 includes: sending, by the SDN controller, an identifier of an SDN switch connected to the SDN controller to the VAS server information collector to request to obtain information about a VAS server connected to the switch; and obtaining, by the SDN controller, the information, about the VAS server connected to the switch, that is sent by the VAS server information collector according to the identifier of the switch.

Therefore, based on the method provided in this embodiment of the present invention, a controller generates a flow table according to a user data packet processing manner of a VAS server that is sent by a VAS and sent by a VAS information collector, a 5-tuple of a user data packet, and a service chain information; and sends the flow table to an SDN switch, so that when a VAS server modifying a 5-tuple exists, the SDN switch can also send the user data packet to a related VAS server according to the generated flow table.

FIG. 3 is a schematic flowchart of another flow table generating method according to an embodiment of the present invention. The method provided in this embodiment of the present invention may be executed by any proper apparatus, for example, a VAS server information collector, but the present invention is not limited thereto. The method provided in this embodiment of the present invention may cooperate with the method provided in the embodiment of the present invention shown in FIG. 2.

S301: A VAS server information collector receives VAS server information reported by a VAS server, where the VAS server information includes a VAS server identifier, an identifier of an SDN switch connected to the VAS server, and a user data packet processing manner of the VAS server.

S302: The VAS server information collector receives request information sent by an SDN controller to request to obtain information about a VAS server connected to an SDN switch that is connected to the SDN controller, where the request information includes an identifier of the SDN switch connected to the SDN controller.

S303: The VAS server information collector queries the VAS server information according to the identifier of the SDN switch to obtain a VAS server identifier of the VAS server connected to the SDN switch and a user data packet processing manner of the VAS server; and sends the VAS server identifier of the VAS server connected to the SDN switch and the user data packet processing manner of the VAS server to the SDN controller, so that the SDN controller generates a flow table and sends the flow table to the SDN switch.

Therefore, based on the method provided in this embodiment of the present invention, a VAS server information collector receives VAS server information, where the VAS server information includes a user data packet processing manner of a VAS server; and sends the VAS server information to a controller, so that the SDN controller generates a flow table and sends the flow table to an SDN switch. A part required by the SDN controller to generate the flow table is the user data packet processing manner in the VAS server information. Therefore, even though a VAS server modifying a 5-tuple of a user data packet exists in a service chain, the SDN switch may also send the user data packet to a related VAS server according to the flow table.

Figure 4:
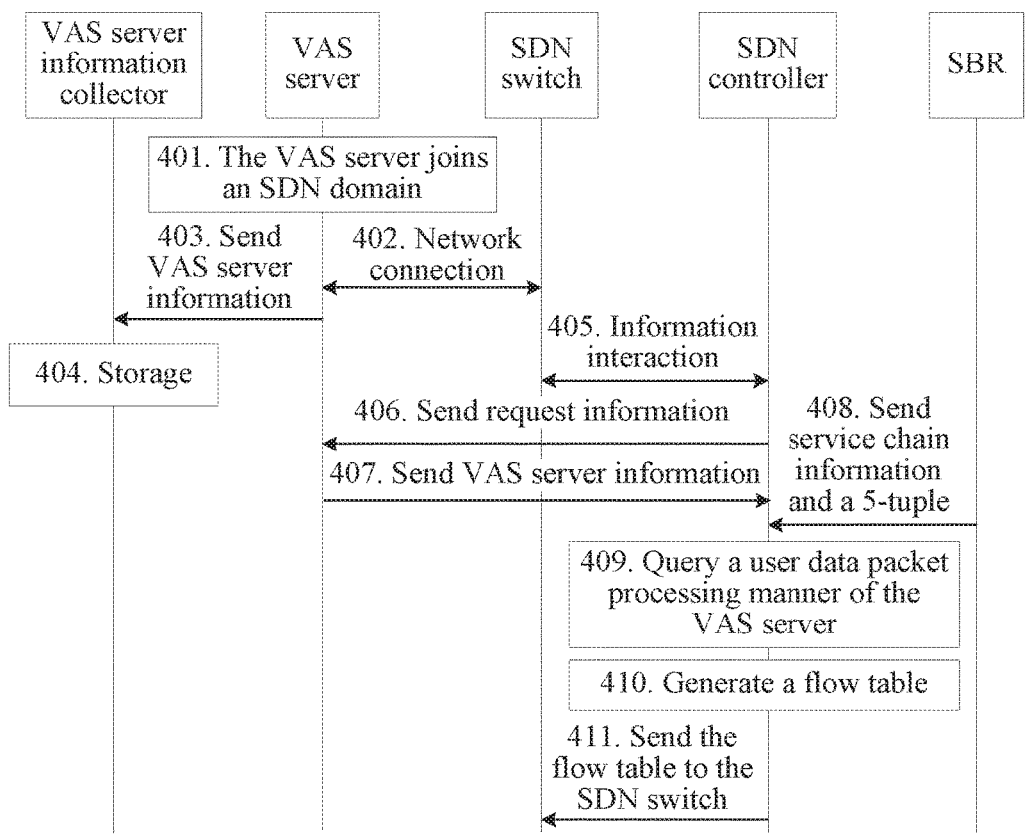
FIG. 4 is a signaling interaction diagram showing that a VAS information collector obtains VAS server information and sends the VAS server information to an SDN controller in the embodiment of the present invention that is shown in FIG. 3.

FIG. 4 is a signaling interaction diagram showing that a VAS information collector obtains VAS server information and sends the VAS server information to an SDN controller in the embodiment of the present invention that is shown in FIG. 3.

As shown in FIG. 4, the specific process includes:

S401: A VAS server joins an SDN domain to perform function configuration.

Specifically, initialization of a virtual machine in which the VAS server is located, and deploying, by the VAS server, a function for the virtual machine are included.

S402: Connect the virtual machine in which the VAS server is located to an SDN switch.

The VAS server is connected to the corresponding SDN switch, and an identifier of the connected SDN switch is obtained.

The identifier of the SDN switch connected to the VAS server includes a sequence number of the SDN switch, and the like, and may be used for indicating the SDN switch.

S403: The VAS server sends the VAS server information to a VAS server information collector.

Specifically, a connection is established between the VAS server and the VAS server information collector, and the VAS server information is sent to the VAS server information collector. The VAS server information includes a VAS server identifier, the identifier of the SDN switch connected to the VAS server, a user data packet processing manner of the VAS server, a MAC address of the VAS server, a number of an inbound port of the SDN switch connected to the VAS server, and the like.

The VAS server identifier includes an identifier that can be used for identifying a specific VAS server, such as a sequence number of the VAS server.

S404: The VAS server information collector stores the VAS server information.

S405: An SDN controller and an SDN switch perform information interaction.

Further, the SDN controller obtains an identifier of the SDN switch.

S406: The SDN controller sends request information to the VAS server information collector to request to obtain information about a VAS server connected to the SDN switch under the control of the SDN controller.

Specifically, the request information includes the identifier of the SDN switch.

S407: The VAS server information collector sends information about the VAS server connected to the SDN switch that is connected to the SDN controller to the SDN controller.

The VAS server information queries the VAS server information according to the identifier of the SDN switch to obtain VAS server information, and sends the VAS server information to the SDN controller.

S408: An SBR sends service chain information and 5-tuple (5-tuple) information of a user data packet to the SDN controller.

The service chain information includes an identifier of a VAS server in a service chain, and the 5-tuple information includes a source IP address, a source port, a destination IP address, a destination port, and a transport layer protocol number of the user data packet.

S409: The SDN controller queries the VAS server information according to an identifier of a VAS server in the service chain to obtain a user data packet processing manner of the VAS server.

Specifically, the VAS server information includes a VAS server identifier, an identifier of an SDN switch connected to the VAS server, and a user data packet processing manner of the VAS server.

The user data packet processing manner of the VAS server includes whether a VAS server in the service chain modifies a 5-tuple of a user data packet, and whether the 5-tuple is modified with a rule.

S410: The SDN controller generates a flow table according to the user data packet processing manner of the VAS server in the service chain and the service chain information.

S411: The SDN controller sends the flow table to the corresponding SDN switch.

Figure 5:
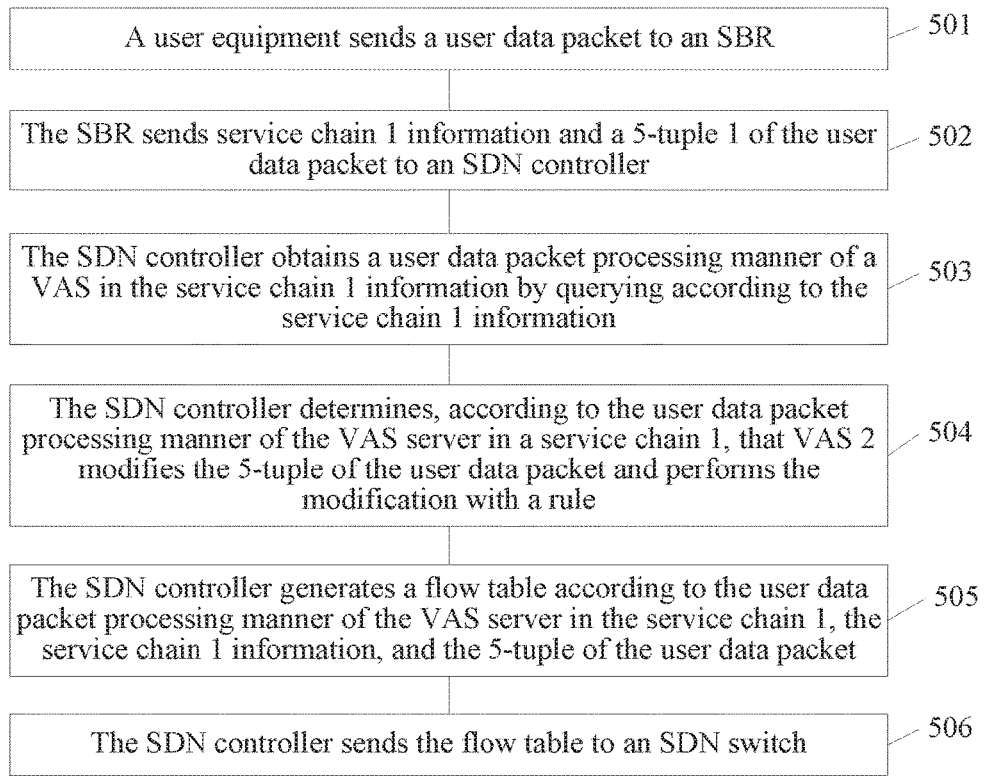
FIG. 5 is a schematic flowchart of a flow table generating method according to an embodiment of the present invention.

FIG. 5 is a schematic flowchart of a flow table generating method according to an embodiment of the present invention. This embodiment of the present invention is a specific embodiment of the embodiments of the present invention that are shown in FIG. 2 and FIG. 3.

This embodiment of the present invention provides a flow table generating method in a case in which an SDN controller determines, according to a user data packet processing manner of a VAS server in the service chain, that a VAS modifying a 5-tuple and performing the modification with a rule exists in the service chain.

In this embodiment of the present invention, a service chain 1 of the user data packet has three VAS servers, and identifiers of the VAS servers are separately VAS 1, VAS 2, and VAS 3. The VAS 1 is directly connected to an SDN switch 1, the VAS 2 is directly connected to an SDN switch 2, the VAS 3 is directly connected to an SDN switch 3, and the SDN switches are also directly connected to each other. The deployment in this embodiment of the present invention is for ease of description. Optionally, one SDN switch may be connected to multiple VAS servers, and the SDN switches may also be indirectly connected to each other, which is not limited in the present invention.

S501: A user equipment sends a user data packet to an SBR.

The SBR determines that a service chain of the user data packet is the service chain 1, and extracts a 5-tuple of the user data packet, where information about the 5-tuple is identified by 5-tuple 1.

S502: The SBR sends service chain 1 information and a 5-tuple 1 of the user data packet to an SDN controller.

S503: The SDN controller obtains a user data packet processing manner of a VAS in the service chain 1 information by querying according to the service chain 1 information.

The SDN controller queries, according to the identifiers of the VAS servers in the service chain 1, to obtain user data packet processing manners of the VAS servers in the service chain information 1, that is, user data packet processing manners of the three VAS servers: VAS 1, VAS 2, and VAS 3. For the specific query step, reference may be made to S401 to S409 in the embodiment of the present invention that is shown in FIG. 4.

S504: The SDN controller determines, according to the user data packet processing manner of the VAS server in the service chain 1, that the VAS 2 modifies the 5-tuple of the user data packet and performs the modification with a rule.

The performing the modification with a rule refers to that the 5-tuple of the user data packet before the modification can be determined according to a 5-tuple of the user data packet after the modification. That is, the 5-tuple of the user data packet after the modification and the 5-tuple of the user data packet before the modification are in a one-to-one correspondence or a many-to-one correspondence. For example, the VAS 2 modifies a source IP address 192.168.1.*/255 in the 5-tuple of the user data packet to 10.1.1.*/255, or modifies a source IP 192.168.1.*/255 in the 5-tuple of the user data packet to 10.1.1.*/255, 10.1.2.*/255, and 10.1.3.*/255. As shown in the example, the 5-tuple of the user data packet may be modified by a VAS server to one or more other 5-tuples, but the modification is performed with a rule as long as the 5-tuple before modification can be determined according to a 5-tuple after modification. When 5-tuples of different user data packets are modified by a same VAS server to form a same 5-tuple, and an original 5-tuple of a user data packet cannot be determined according to the 5-tuple after modification, the modification is performed without any rule.

In another embodiment of the present invention, multiple VASs modifying the 5-tuple with a rule may exist in the service chain, and for a processing manner thereof, reference may be made to related steps in this embodiment of the present invention.

S505: The SDN controller generates a flow table according to the user data packet processing manner of the VAS server in the service chain 1, the service chain 1 information, and the 5-tuple of the user data packet.

Specifically, before the VAS2, a match entry of the flow table is generated by the SDN controller according to the original 5-tuple of the user data packet, and after the VAS2, a match entry of the flow table is generated by the SDN controller according to a 5-tuple that is modified by the VAS2.

Further, multiple VAS servers modifying the 5-tuple with a rule may exist in the service chain, which is not limited in the present invention.

S506: The SDN controller sends the flow table to an SDN switch.

The SDN switch can send the user data packet to a VAS server in the service chain according to the flow table.

Therefore, based on the method provided in this embodiment of the present invention, an SDN controller obtains a user data packet processing manner of a VAS server that is sent by a VAS server information collector, determines, according to the user data packet processing manner of the VAS server, that a VAS server modifying a 5-tuple and performing the modification with a rule exists in a service chain, then generates a flow table according to the user data packet processing manner of the VAS server in the service chain, service chain information, and a 5-tuple of a user data packet, and sends the flow table to an SDN switch, so that the SDN switch can send the user data packet to a VAS server according to the flow table when a VAS server modifying the 5-tuple exists in the service chain.

Figure 6:
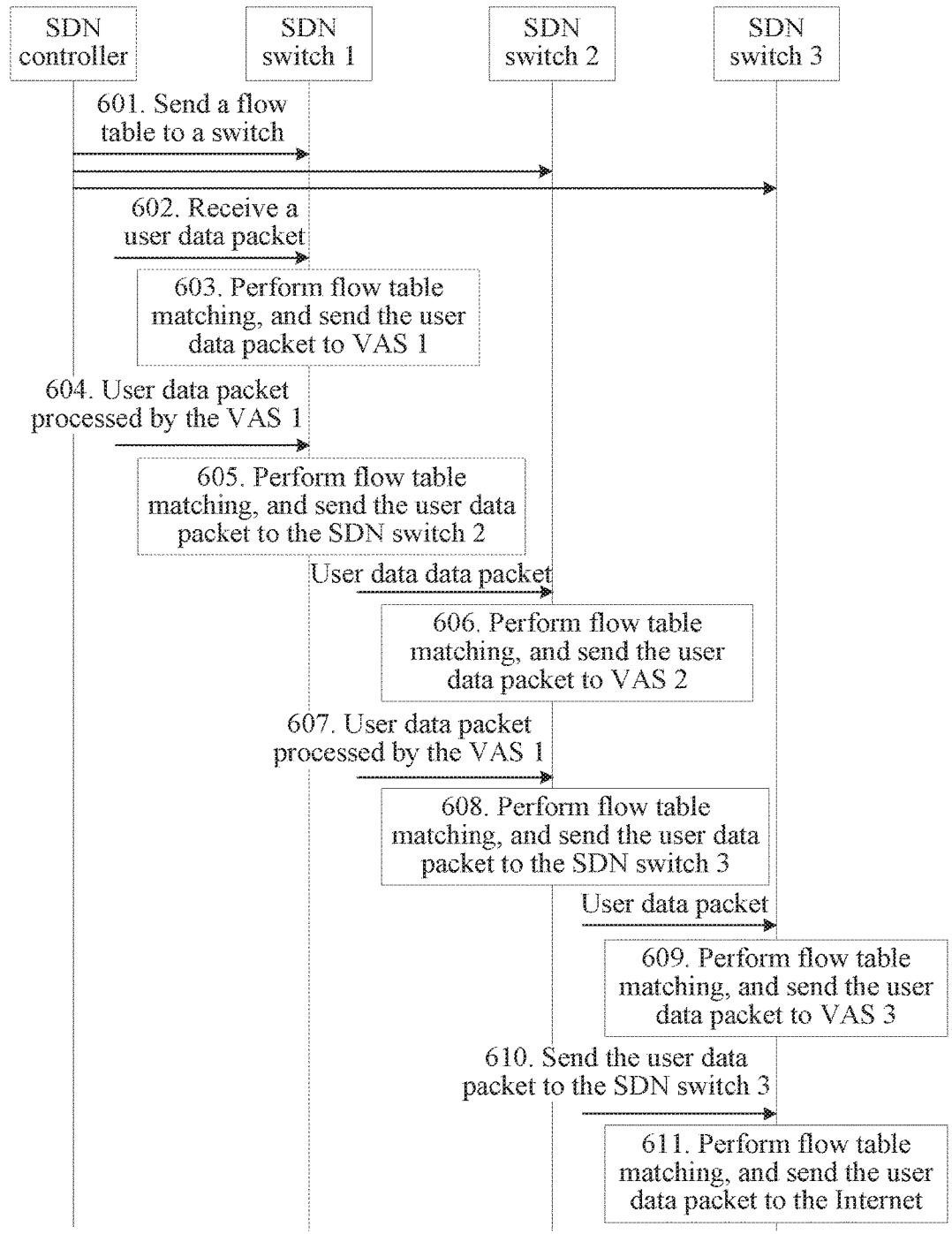
FIG. 6 is a signaling interaction diagram showing that after a flow table is generated and sent to an SDN switch, how the SDN switch sends the user data packet to a VAS server in a service chain according to the flow table in the embodiment of the present invention that is shown in FIG. 5.

FIG. 6 is a signaling interaction diagram showing that after a flow table is generated and sent to an SDN switch, how the SDN switch sends the user data packet to a VAS server in a service chain according to the flow table in the embodiment of the present invention that is shown in FIG. 5.

As shown in FIG. 6, a specific process includes:

S601: AN SDN controller sends a flow table to a corresponding SDN switch.

The SDN controller sends the flow table to an SDN switch 1, an SDN switch 2, and an SDN switch 3.

S602: The SDN switch 1 receives a user data packet.

S603: The SDN switch 1 performs flow table matching, and sends the user data packet to the VAS 1.

Specifically, the SDN switch 1 matches a 5-tuple 1 of the user data packet according to a match entry of the flow table, modifies a destination MAC address of the user data packet to a MAC address of the VAS 1, and sends the user data packet to the VAS 1.

An objective of performing the matching by the SDN switch is to determine a flow table of the user data packet processed by a VAS, and then send the user data packet to a next VAS server according to the flow table.

S604: After processing the user data packet, the VAS 1 sends the user data packet to the SDN switch 1.

S605: The SDN switch 1 performs flow table matching, and sends the user data packet to the SDN switch 2.

The SDN switch 1 matches the original 5-tuple of the user data packet with a number of an inbound port 1 connected to the VAS1 according to the match entry of the flow table, modifies the destination MAC address of the user data packet to a MAC address of the VAS2, and sends the user data packet to the SDN switch 2.

S606: The SDN switch 2 performs flow table matching, and sends the user data packet to the VAS2.

The SDN switch 2 matches the 5-tuple 1 of the user data packet, and sends the user data packet to the VAS2.

S607: After processing the user data packet, the VAS2 sends the user data packet to the SDN switch 2.

The VAS2 modifies the 5-tuple of the user data packet to 5-tupple2.

S608: The SDN switch 2 performs flow table matching, and sends the user data packet to the SDN switch 3.

The SDN switch 2 matches, according to the match entry of the flow table, the 5-tuple 5-tupple2 obtained after the modification and a port 2 that is on the SDN switch and is connected to the VAS2, and modifies the destination MAC address of the user data packet to a MAC address of the VAS3; and the switch sends the user data packet to the SDN switch 3.

S609: The SDN switch 3 performs flow table matching, and sends the user data packet to the VAS3.

The SDN switch 3 matches the 5-tuple 5-tupple2 obtained after the modification according to the match entry of the flow table, and modifies the destination MAC address of the user data packet to the MAC address of the VAS3.

S610: After processing the user data packet, the VAS3 sends the user data packet to the SDN switch 3.

S611: The SDN switch 3 performs flow table matching, and sends the user data packet to the Internet.

The SDN switch 3 matches the 5-tuple 5-tupple2 obtained after the modification and an inbound port number 3 according to the match entry of the flow table, and sends the user data packet to the Internet.

Therefore, based on the flow table match process shown in FIG. 6, an SDN controller generates a flow table according to a user data packet processing manner of a VAS server in a service chain, service chain information, and a 5-tuple of a user data packet, so that after receiving the flow table, an SDN switch can match a user data packet processed by a VAS server, so as to ensure that the SDN controller sends the user data packet to a corresponding VAS server according to the flow table.

FIG. 7 is a schematic flowchart of another flow table generating method according to an embodiment of the present invention. This embodiment of the present invention is a specific embodiment of the embodiments of the present invention that are shown in FIG. 2 and FIG. 3. This embodiment of the present invention provides a flow table generating method in a case in which an SDN controller determines, according to a user data packet processing manner of a VAS server in the service chain, that a VAS modifying a 5-tuple and performing the modification without any rule exists in the service chain.

In this embodiment of the present invention, a service chain 1 of the user data packet has three VAS servers, and the VAS servers are separately VAS 1. VAS 2, and VAS 3. The VAS 1 is directly connected to an SDN switch 1, the VAS 2 is directly connected to an SDN switch 2, the VAS 3 is directly connected to an SDN switch 3, and the SDN switches are also directly connected to each other. The deployment in this embodiment of the present invention is for ease of description. Optionally, one SDN switch may be connected to multiple VAS servers, and the SDN switches may also be indirectly connected to each other, which is not limited in the present invention.

As shown in FIG. 7, a flow table generating method provided in this embodiment of the present invention includes:

For S701 to S703, reference may be made to S501 to S503 in the embodiment of the present invention that is shown in FIG. 5.

S704: The SDN controller determines, according to the user data packet processing manner of the VAS in the service chain 1, that the VAS 2 modifies the 5-tuple of the user data packet and performs the modification without any rule.

Specifically, the modifying the 5-tuple without any rule is that the 5-tuple before modification cannot be determined according to a 5-tuple after modification. For example, a 5-tuple of a user data packet A is a, a 5-tuple of a user data packet B is b, both the user data packet A and the user data packet B go through a VAS server C, but the user data packet A subsequently accesses a VAS server D and the user data packet B subsequently accesses a VAS server E. After the user data packet A and the user data packet B are processed by the VAS server C, 5-tuples of both the user data packet A and the user data packet B are modified to c, and then the VAS processor is a VAS server modifying the 5-tuple without any rule because the 5-tuple before modification cannot be determined according to the 5-tuple after modification. In this case, if the method shown in FIG. 5 is used, and match entries of flow tables are c, the SDN controller cannot determine, according to the match entries of the flow tables after the user data packet A and the user data packet B are returned, which one of two flow tables is a flow table of the user data packet A or the user data packet B, because the match entries of the flow tables are all c in this case. However, execution entries of the two flow tables are different, an execution entry of one flow table is to send a user data packet to the VAS server D, and an execution entry of the other flow table is to send a user data packet to the VAS server E; therefore, the SDN switch cannot accurately send the user data packet A or the user data packet B to a next VAS server. Therefore, in this case, proceed to S705.

In another embodiment of the present invention, two or more VAS servers modifying the 5-tuple of the user data packet without any rule may exist in the service chain of the user data packet. If more than two VAS servers modifying the 5-tuple of the user data packet without any rule exist, during network deployment, the multiple VAS servers modifying the 5-tuple of the user data packet without any rule are configured in a same service chain.

S705: The SDN controller adjusts the VAS2 to an end of the service chain.

Specifically, the SDN controller determines that the VAS 2 modifies the 5-tuple of the user data packet and performs the modification without any rule, and if the VAS2 is not at the end of the service chain, the SDN controller adjusts the VAS2 to the end of the service chain.

S706: The SDN controller generates a flow table according to the 5-tuple of the user data packet, a MAC address of the VAS2, and the service chain information.

Specifically, the SDN controller may obtain the MAC address of the VAS server from VAS server information sent by a VAS server information collector, or the SDN controller may query, according to an identifier of the VAS server, a database of the SDN controller to obtain the MAC address of the VAS server.

Before the VAS2, a match domain of the flow table is generated by the SDN controller according to the original 5-tuple of the user data packet, and after the VAS2, a match domain of the flow table is generated by the controller according to the MAC address of the VAS2.

S707: The SDN controller sends the flow table to an SDN switch.

Therefore, based on the flow table generating method provided in this embodiment of the present invention, when a VAS server modifying a 5-tuple without any rule exists in a service chain, it can be ensured that an SDN controller sends a user data packet to a VAS server in the service chain.

In another embodiment of the present invention, a VAS server modifying a 5-tuple with a rule and a VAS server modifying a 5-tuple without any rule may simultaneously exist in the service chain of the user data packet, and for a processing manner, reference may be made to the methods provided in the embodiments of the present invention that are shown in FIG. 2, FIG. 3. FIG. 5, and FIG. 7.

Figure 8:
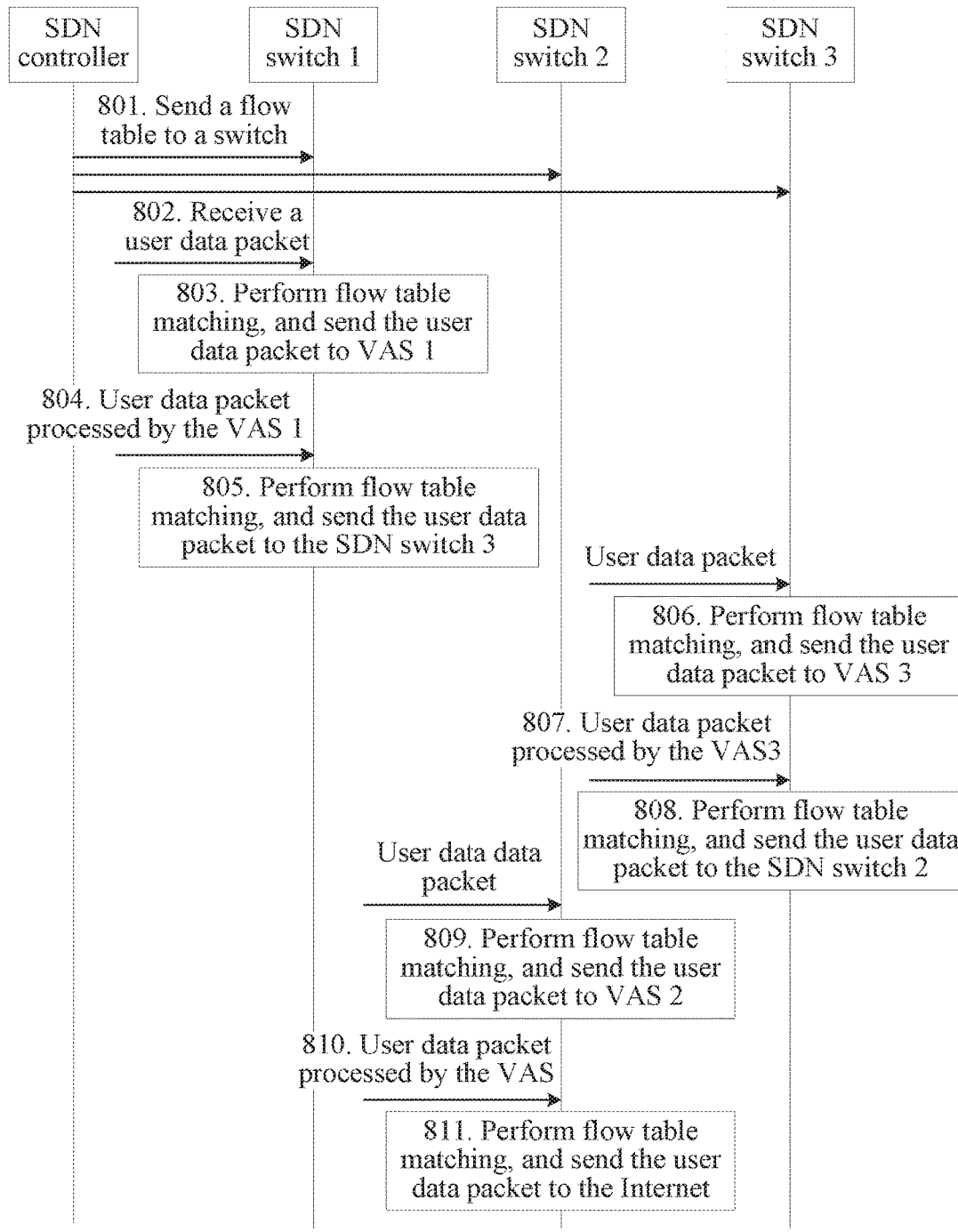
FIG. 8 is a signaling interaction diagram showing that after a flow table is generated and sent to an SDN switch, the SDN switch sends a user data packet to a VAS server in a service chain according to the flow table in the embodiment of the present invention that is shown in FIG. 7.

FIG. 8 is a signaling interaction diagram showing that after a flow table is generated and sent to an SDN switch, the SDN switch sends a user data packet to a VAS server in a service chain according to the flow table in the embodiment of the present invention that is shown in FIG. 7.

For S801 to S804, reference may be made to S601 to S604 in FIG. 6.

S805: The SDN switch performs flow table matching, and sends the user data packet to the SDN switch 3.

The VAS2 is adjusted by the SDN switch to an end of the service chain; and after being processed by the VAS 1, the user data packet should subsequently be processed by the VAS3.

S806: The SDN switch 3 performs flow table matching, and sends the user data packet to the VAS3.

For a specific match process in this embodiment of the present invention, reference may be made to related steps in the embodiment of the present invention that is shown in FIG. 6.

S807: After processing the user data packet, the VAS3 returns a processed user data packet to the SDN switch 3.

S808: The SDN switch 3 performs flow table matching, and sends the user data packet to the SDN switch 2.

S809: The SDN switch 2 performs flow table matching, and sends the user data packet to the VAS2.

S810: The VAS2 processes the user data packet, and sends a processed user data packet to the SDN switch 2.

S811: The SDN switch 2 performs flow table matching, and sends the user data packet to the Internet.

Specifically, after the VAS2 modifies the 5-tuple of the user data packet, a match domain of the flow table is generated by the SDN controller according to a MAC address of the VAS2 and a number of an inbound port on a switch connected to the VAS2. When processing the user data packet, the VAS2 modifies a MAC address of the user data packet to the MAC address of the VAS2; and then after receiving the user data packet returned by the VAS2, the SDN switch 2 uses the match entry of the flow table generated according to the MAC address of the VAS2 and the number of the inbound port on the switch connected to the VAS2 to match the user data packet, and then sends the user data packet to the Internet.

Therefore, based on the flow table match process shown in FIG. 8, because an SDN controller determines, according to a user data packet processing manner of a VAS server in a service chain, that a VAS server modifying a 5-tuple without any rule exists in the service chain; and then generates a flow table according to a MAC address of the VAS server modifying the 5-tuple without any rule, service chain information, and a 5-tuple of a user data packet, so that after receiving the flow table, an SDN switch can match, according to a match entry of the flow table, a user data packet processed by the VAS server modifying the 5-tuple without any rule, so as to ensure that the SDN controller sends the user data packet to a corresponding VAS server according to the flow table.

Figure 9:
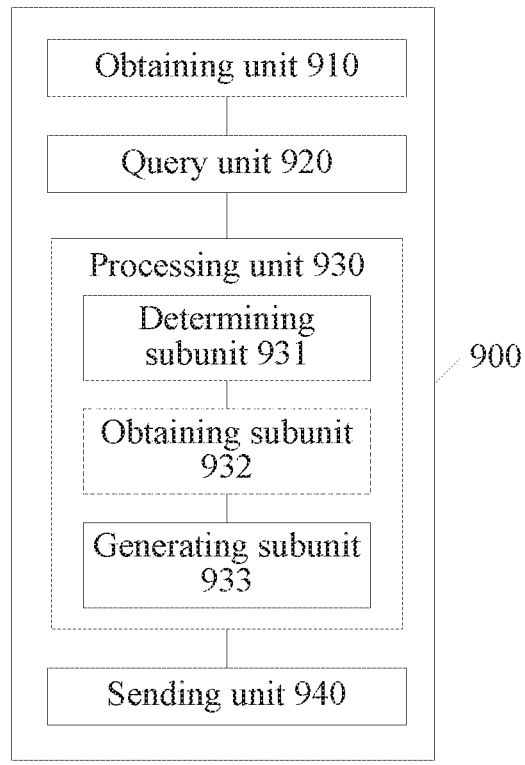
FIG. 9 is a schematic block diagram of a flow table generating apparatus 900 according to an embodiment of the present invention.

FIG. 9 is a schematic block diagram of a flow table generating apparatus 900 according to an embodiment of the present invention. The apparatus may be an SDN controller, which is not limited in the present invention.

As shown in FIG. 9, a flow table generating apparatus 900 provided in this embodiment of the present invention includes:

an obtaining unit 910, configured to obtain VAS server information sent by a value-added service VAS server information collector, where the VAS server information includes a VAS server identifier and a user data packet processing manner of a VAS server; and obtain a 5-tuple of a user data packet and service chain information that are sent by a service-based router SBR, where the service chain information includes an identifier of a VAS server in the service chain;

a query unit 920, configured to query the VAS server information according to the identifier of the VAS server to obtain VAS server information of the VAS server in the service chain;

a processing unit 930, configured to generate a flow table according to a user data packet processing manner of the VAS server in the service chain, the 5-tuple of the user data packet, and the service chain information; and a sending unit 940, configured to send the flow table to an SDN switch.

Therefore, based on a flow table generating apparatus provided in this embodiment of the present invention, VAS server information sent by a VAS server information collector is obtained, then a flow table is generated according to a user data packet processing method of a VAS server and a 5-tuple of a user data packet that are in information about VAS servers in a service chain, and the service chain information, and the flow table is sent to an SDN switch, so that the SDN switch can send the user data packet to a related VAS server according to the flow table.

Optionally, as an embodiment of the present invention, the processing unit 930 includes: a determining subunit 931, an obtaining subunit 932, and a generating subunit 933. The determining subunit 931 is configured to determine, according to the user data packet processing manner of the VAS server in the service chain, that a first VAS server of VAS servers in the service chain modifies the 5-tuple of the user data packet and performs the modification with a rule. The obtaining subunit 932 is configured to obtain, according to the 5-tuple of the user data packet and a user data packet processing manner of the VAS server, a 5-tuple that is modified by the first VAS server. The generating subunit 933 is configured to generate the flow table according to the 5-tuple of the user data packet, the 5-tuple that is modified by the first VAS server, and the service chain information, where after the first VAS server modifies the 5-tuple of the user data packet, a match domain of the flow table is generated by the processing unit according to the 5-tuple that is modified by the first VAS server. Therefore, when one or more VAS servers modifying the 5-tuple of the user data packet and performing the modification with a rule exist in the service chain of the user data packet, the generated flow table enables the SDN switch to send the user data packet to a corresponding VAS server according to the flow table generated by the apparatus according to the 5-tuple of the user data packet, a 5-tuple obtained after modification by the VAS server modifying the 5-tuple with a rule, and the service chain information.

Optionally, as another embodiment of the present invention, the processing subunit 930 includes: a determining subunit 931, an obtaining subunit 932, and a generating subunit 933. The determining subunit 930 is configured to determine, according to the user data packet processing manner of the VAS server in the service chain, that a first VAS server modifying the 5-tuple of the user data packet and performing the modification without any rule exists in the service chain. The obtaining subunit 932 is configured to obtain a MAC address of the first VAS server. That the obtaining subunit is configured to obtain the MAC address of the first VAS server specifically has two situations: In one situation, the VAS server information further includes a MAC address of a VAS server, and the obtaining subunit 932 is configured to obtain the MAC address of the first VAS server from the VAS server information obtained by the query unit 920 by query. In the other situation, the obtaining subunit 932 is further configured to query, according to an identifier of the first VAS server, a database to obtain the MAC address of the first VAS server. The generating subunit 933 is configured to adjust the first VAS server modifying the user data packet without any rule to an end of the service chain, and generate the flow table according to the 5-tuple of the user data packet, the MAC address of the first VAS server, a number of an inbound port on an SDN switch connected to the first VAS server, and the service chain information, where after the first VAS server, a match domain of the flow table is generated by the processing unit according to the MAC address of the first VAS server. Therefore, when one or more VAS servers modifying the 5-tuple of the user data packet without any rule exist in the service chain of the user data packet, the SDN switch can send the user data packet to a corresponding VAS server according to the flow table generated by the apparatus.

Optionally, in still another embodiment of the present invention, the processing unit 930 specifically includes: a determining subunit 931 and a generating subunit 933. The determining subunit 931 is configured to determine, according to the user data packet processing manner of the VAS server in the service chain, that no VAS server modifying the 5-tuple of the user data packet exists in the service chain; and the generating subunit 933 is configured to generate the flow table according to the 5-tuple of the user data packet and the service chain information. When the apparatus determines that no VAS server modifying the 5-tuple exists in the service chain, the apparatus may generate the flow table according to the 5-tuple of the user data packet and the service chain information. After receiving the flow table, the SDN switch can send the user data packet to a VAS server according to the flow table.

Optionally, in still another embodiment of the present invention, the sending unit 940 is further configured to send an identifier of an SDN switch connected to the apparatus to the VAS server information collector to request to obtain information about a VAS server connected to the SDN switch; and the obtaining unit 910 is specifically configured to obtain the information, about the VAS server connected to the SDN switch, that is sent by the VAS server information collector according to the identifier of the SDN switch. Therefore, the apparatus obtains a part needed to generate the flow table, that is, a user data packet processing manner of the VAS server in the VAS server information.

A flow table generating apparatus 900 according to this embodiment of the present invention may correspond to an SDN controller in a flow table generating method in the embodiments of the present invention. The operations and/or functions and other operations and/or functions of modules in the apparatus 900 separately aim to implement corresponding procedures in FIG. 2, FIG. 3, FIG. 4, and FIG. 5, which are not described again herein for conciseness.

Figure 10:
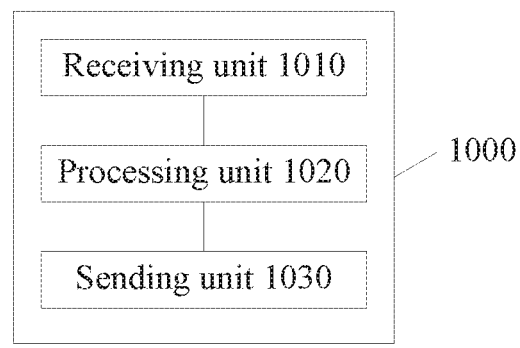
FIG. 10 is a schematic block diagram of another flow table generating apparatus 1000 according to an embodiment of the present invention.

FIG. 10 is a schematic block diagram of another flow table generating apparatus 1000 according to an embodiment of the present invention. The flow table generating apparatus 1000 may be a VAS server information collector, which is not limited in the present invention.

As shown in FIG. 10, the apparatus 1000 includes:

a receiving unit 1010, configured to receive VAS server information reported by a VAS server, where the VAS server information includes a VAS server identifier, an identifier of an SDNSDN switch connected to the VAS server, and a user data packet processing manner of the VAS server; and receive request information sent by an SDN controller to request to obtain information about a VAS server connected to an SDN switch that is connected to the SDN controller, where the request information includes an identifier of the SDN switch connected to the SDN controller; and a processing unit 1020, configured to query the VAS server information according to the identifier of the SDN switch to obtain the information about the VAS server connected to the SDN switch that is connected to the SDN controller; and a sending unit 1030, configured to send the information about the VAS server connected to the SDN switch that is connected to the SDN controller to the SDN controller, so that the SDN controller generates a flow table and sends the flow table to the SDN switch.

Therefore, based on the flow table generating apparatus in this embodiment of the present invention, VAS server information is sent to an SDN controller, so that the SDN controller may obtain a user data packet processing manner of a VAS server in the VAS server information, then generate a flow table, and send the flow table to an SDN switch. Therefore, the SDN switch can send a user data packet to a corresponding VAS server according to the flow table.

The flow table generating apparatus 1000 according to this embodiment of the present invention may correspond to a VAS information collector in a flow table generating method in the embodiments of the present invention. The operations and/or functions and other operations and/or functions of modules in the apparatus 1000 separately aim to implement corresponding procedures in FIG. 2. FIG. 3, FIG. 4, FIG. 5, and FIG. 6, which are not described again herein for conciseness.

Figure 11:
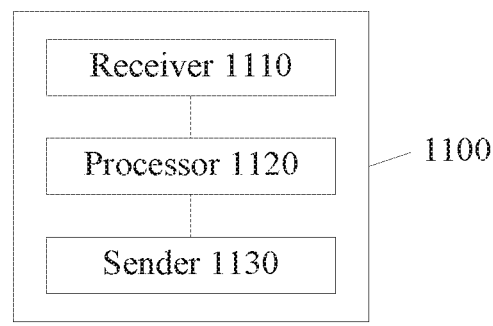
FIG. 11 is a schematic block diagram of a flow table generating apparatus 1100 according to an embodiment of the present invention.

FIG. 11 is a schematic block diagram of a flow table generating apparatus 1100 according to an embodiment of the present invention. The apparatus 1100 may be an SDN controller, which is not limited in the present invention. As shown in FIG. 11, the flow table generating apparatus includes:

a receiver 1110, configured to receive VAS server information sent by a value-added service VAS server information collector, where the VAS server information includes a VAS server identifier and a user data packet processing manner of a VAS server; and receive a 5-tuple of a user data packet and service chain information that are sent by a service-based router SBR, where the service chain information includes an identifier of a VAS server in the service chain;

a processor 1120, configured to query the VAS server information according to the identifier of the VAS server to obtain VAS server information of the VAS server in the service chain, and generate a flow table according to a user data packet processing manner of the VAS server in the service chain, the 5-tuple of the user data packet, and the service chain information; and a sender 1130, configured to send the flow table to an SDN switch.

Therefore, based on a flow table generating apparatus provided in this embodiment of the present invention, VAS server information sent by a VAS server information collector is obtained, then a flow table is generated according to a user data packet processing method of a VAS server and a 5-tuple of a user data packet that are in information about VAS servers in a service chain, and the service chain information, and the flow table is sent to an SDN switch, so that the SDN switch can send the user data packet to a related VAS server according to the flow table.

Optionally, as an embodiment of the present invention, the processor 1120 is specifically configured to determine, according to the user data packet processing manner of the VAS server in the service chain, that a first VAS server of VAS servers in the service chain modifies the 5-tuple of the user data packet and performs the modification with a rule; obtain, according to the 5-tuple of the user data packet and a user data packet processing manner of the VAS server, a 5-tuple that is modified by the first VAS server; and generate the flow table according to the 5-tuple of the user data packet, the 5-tuple that is modified by the first VAS server, and the service chain information, where after the first VAS server modifies the 5-tuple of the user data packet, a match domain of the flow table is generated by the processing unit according to the 5-tuple that is modified by the first VAS server. Therefore, when one or more VAS servers modifying the 5-tuple of the user data packet and performing the modification with a rule exist in the service chain of the user data packet, the generated flow table enables the SDN switch to send the user data packet to a corresponding VAS server according to the flow table generated by the apparatus according to the 5-tuple of the user data packet, a 5-tuple that is modified by the VAS server modifying the 5-tuple with a rule, and the service chain information.

Optionally, as another embodiment of the present invention, the processor 1120 is specifically configured to determine, according to the user data packet processing manner of the VAS server in the service chain, that a first VAS server modifying the 5-tuple of the user data packet and performing the modification without any rule exists in the service chain; and obtain a MAC address of the first VAS server. That the processor 1120 obtains the MAC address of the first VAS server specifically has two situations: In one situation, the VAS server information further includes a MAC address of a VAS server, and the processor 1120 obtains the MAC address of the first VAS server from the VAS server information obtained by query. In the other situation, the processor is further configured to query, according to an identifier of the first VAS server, a database to obtain the MAC address of the first VAS server. The processor 1120 is configured to adjust the first VAS server modifying the user data packet without any rule to an end of the service chain, and generate the flow table according to the 5-tuple of the user data packet, the MAC address of the first VAS server, and the service chain information, where after the first VAS server, a match domain of the flow table is generated by the processor 1120 according to the MAC address of the first VAS server. Therefore, when one or more VAS servers modifying the 5-tuple of the user data packet without any rule exist in the service chain of the user data packet, the SDN switch can send the user data packet to a corresponding VAS server according to the flow table generated by the apparatus.

In still another embodiment of the present invention, the processor 1120 is specifically configured to determine, according to the user data packet processing manner of the VAS server in the service chain, that no VAS server modifying the 5-tuple of the user data packet exists in the service chain; and generate the flow table according to the 5-tuple of the user data packet and the service chain information. When the apparatus determines that no VAS server modifying the 5-tuple exists in the service chain, the apparatus may generate the flow table according to the 5-tuple of the user data packet and the service chain information. After receiving the flow table, the SDN switch can send the user data packet to a VAS server according to the flow table.

Optionally, in still another embodiment of the present invention, the sender 1130 in the apparatus is further configured to send an identifier of an SDN switch connected to the apparatus to the VAS server information collector to request to obtain information about a VAS server connected to the SDN switch; and the receiver 1110 is specifically configured to receive the information, about the VAS server connected to the SDN switch, that is sent by the VAS server information collector according to the identifier of the SDN switch. Therefore, the apparatus obtains a part needed to generate the flow table, that is, a user data packet processing manner of the VAS server in the VAS server information.

A flow table generating apparatus 1100 according to this embodiment of the present invention may correspond to an SDN controller in a flow table generating method in the embodiments of the present invention. The operations and/or functions and other operations and/or functions of modules in the apparatus 900 separately aim to implement corresponding procedures in FIG. 2, FIG. 3, FIG. 4, and FIG. 5, which are not described again herein for conciseness.

It should be understood that the processor 1120 in the apparatus provided in this embodiment of the present invention may be a central processing unit (Central Processing Unit, "CPU" for short), and may further be another general-purpose processor, a digital signal processor (DSP), an application-specific integrated circuit (ASIC), a field-programmable gate array (FPGA) or another programmable logical device, a discrete gate or transistor logical device, a discrete hardware component, or the like. The general-purpose processor may be a microprocessor, or the processor may also be any common processor or the like.

In an implementation process, the foregoing steps may be performed by a hardware integrated logic circuit or an instruction in a form of software that is in the apparatus provided in this embodiment of the present invention. The steps in the method disclosed by the embodiments of the present invention may be directly implemented by a hardware processor, or may be implemented by combining hardware and software modules in a processor. The software module may be located in a mature storage medium in the field, such as a random access memory, a flash memory, a read-only memory, a programmable read-only memory, an electrically erasable programmable memory, or a register. The storage medium is located in a memory, and the apparatus provided in this embodiment of the present invention reads information in the memory and implements the steps in the foregoing methods in combination with hardware of the apparatus, which is no longer described in detail herein to avoid repetition.

Figure 12:
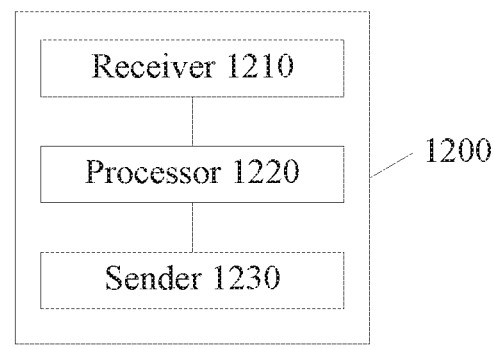
FIG. 12 is a schematic block diagram of another flow table generating apparatus 1200 according to an embodiment of the present invention.

FIG. 12 is a schematic block diagram of another flow table generating apparatus 1200 according to an embodiment of the present invention. The flow table generating apparatus 1200 may be a VAS server information collector, which is not limited in the present invention.

As shown in FIG. 12, the apparatus 1200 includes:

a receiver 1210, configured to receive, a receiving unit 1010, configured to receive VAS server information reported by a VAS server, where the VAS server information includes a VAS server identifier, an identifier of an SDN switch connected to the VAS server, and a user data packet processing manner of the VAS server; and receive request information sent by an SDN controller to request to obtain information about a VAS server connected to an SDN switch that is connected to the SDN controller, where the request information includes an identifier of the SDN switch connected to the SDN controller; and a processor 1220, configured to query the VAS server information according to the identifier of the SDN switch to obtain the information about the VAS server connected to the SDN switch that is connected to the SDN controller; and a sender 1230, configured to send the information about the VAS server connected to the SDN switch that is connected to the SDN controller to the SDN controller, so that the SDN controller generates a flow table and sends the flow table to the SDN switch.

Therefore, based on the flow table generating apparatus in this embodiment of the present invention, VAS server information is sent to an SDN controller, so that the SDN controller may obtain a user data packet processing manner of a VAS server in the VAS server information, then generate a flow table, and send the flow table to an SDN switch. Therefore, the SDN switch can send a user data packet to a corresponding VAS server according to the flow table.

The flow table generating apparatus 1200 according to this embodiment of the present invention may correspond to a VAS information collector in a flow table generating method in the embodiments of the present invention. The operations and/or functions and other operations and/or functions of modules in the apparatus 1200 separately aim to implement corresponding procedures in FIG. 2, FIG. 3, FIG. 4, FIG. 5, and FIG. 6, which are not described again herein for conciseness.

It should be understood that the apparatus provided in this embodiment of the present invention may include a central processing unit (CPU), and may further include another general-purpose processor, a digital signal processor (DSP), an application-specific integrated circuit (ASIC), a field-programmable gate array (FPGA) or another programmable logical device, a discrete gate or transistor logical device, a discrete hardware component, or the like. The general-purpose processor may be a microprocessor, or the processor may also be any common processor or the like.

In an implementation process, the foregoing steps may be completed by a hardware integrated logic circuit or an instruction in a form of software that is in the apparatus provided in this embodiment of the present invention. The steps in the method disclosed by the embodiments of the present invention may be directly implemented by a hardware processor, or may be implemented by combining hardware and software modules in a processor. The software module may be located in a mature storage medium in the field, such as a random access memory, a flash memory, a read-only memory, a programmable read-only memory, an electrically erasable programmable memory, or a register. The storage medium is located in a memory, and the apparatus provided in this embodiment of the present invention reads information in the memory and implements the steps in the foregoing methods in combination with hardware of the apparatus, which is no longer described in detail herein to avoid repetition.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A flow table generating method, comprising:
   obtaining, by a software defined network SDN controller, value-added service VAS server information sent by a VAS server information collector, wherein the VAS server information includes a VAS server identifier and a user data packet processing manner of a VAS server; wherein the user data packet processing manner comprises: determining whether the VAS server modifies a 5-tuple extracted from a user data packet,
   in response to the VAS server modifying the 5-tuple of the user data packet, determining whether the 5-tuple of the user data packet is modified with a rule based on whether the 5-tuple of the user data packet before modification by the VAS server can be determined according to a 5-tuple of the user data packet after modification by the VAS server;
   receiving, by the SDN controller, a 5-tuple extracted from a user data packet and service chain information that are sent by a service-based router SBR, wherein the service chain information comprises an identifier of a VAS server in the service chain;
   obtaining, by the SDN controller, VAS server information of the VAS server in the service chain from the VAS server information according to the identifier of the VAS server; and
   generating, by the SDN controller, a flow table according to the user data packet processing manner of the VAS server in the service chain, the 5-tuple extracted from the user data packet, and the service chain information; and sending the flow table to an SDN switch.

2. The method according to claim 1, wherein the generating, by the SDN controller, a flow table according to the user data packet processing manner of the VAS server in the service chain, the 5-tuple extracted from the user data packet, and the service chain information comprises:
   determining, by the SDN controller according to the user data packet processing manner of the VAS server in the service chain, that a first VAS server of VAS servers in the service chain modifies the 5-tuple extracted from the user data packet and performs the modification with a rule;
   obtaining, by the SDN controller according to the 5-tuple extracted from the user data packet and a user data packet processing manner of the first VAS server, a 5-tuple that is modified by the first VAS server; and
   generating, by the SDN controller, the flow table according to the 5-tuple extracted from the user data packet, the 5-tuple that is modified by the first VAS server, and the service chain information, wherein after the first VAS server, a match domain of the flow table is generated by the SDN controller according to the 5-tuple that is modified by the first VAS server.

3. The method according to claim 1, wherein the generating, by the SDN controller, a flow table according to the user data packet processing manner of the VAS server in the service chain, the 5-tuple extracted from the user data packet, and the service chain information comprises:
   determining, by the SDN controller according to the user data packet processing manner of the VAS server in the service chain, that a first VAS server modifying the 5-tuple extracted from the user data packet and performing the modification without any rule exists in the service chain;
   adjusting, by the SDN controller, the first VAS server modifying the user data packet without any rule to an end of the service chain, and obtaining a media access control MAC address of the first VAS server; and
   generating, by the SDN controller, the flow table according to the 5-tuple extracted from the user data packet, the MAC address of the first VAS server, and the service chain information, wherein after the first VAS server, a match domain of the flow table is generated by the SDN controller according to the MAC address of the first VAS server.

4. The method according to claim 3, wherein the VAS server information further comprises a MAC address of the VAS server; and
the obtaining, by the SDN controller, the MAC address of the first VAS server comprises:
obtaining, by the SDN controller, the MAC address of the first VAS server from the VAS server information obtained by query.

5. The method according to claim 3, wherein the obtaining, by the SDN controller, the MAC address of the first VAS server comprises:
querying, by the SDN controller according to an identifier of the first VAS server, a database to obtain the MAC address of the first VAS server.

6. The method according to claim 1, wherein the generating, by the SDN controller, a flow table according to the user data packet processing manner of the VAS server in the service chain, the 5-tuple extracted from the user data packet, and the service chain information comprises:
determining, by the SDN controller according to the user data packet processing manner of the VAS server in the service chain, that no VAS server modifying the 5-tuple extracted from the user data packet exists in the service chain; and
generating, by the SDN controller, the flow table according to the 5-tuple extracted from the user data packet and the service chain information.

7. The method according to claim 1, wherein the obtaining, by the SDN controller, VAS server information sent by a VAS server information collector comprises:
sending, by the SDN controller, an identifier of an SDN switch connected to the SDN controller to the VAS server information collector to request to obtain information about a VAS server connected to the SDN switch; and
obtaining, by the SDN controller, the information, about the VAS server connected to the SDN switch, that is sent by the VAS server information collector according to the identifier of the SDN switch.

8. A flow table generating method, comprising:
receiving, by a value-added service VAS server information collector, VAS server information reported by a VAS server, wherein the VAS server information includes a VAS server identifier, an identifier of a software defined network SDN switch connected to the VAS server, and a user data packet processing manner of the VAS server; wherein the user data packet processing manner comprises: determining whether the VAS server modifies a 5-tuple extracted from a user data packet,
in response to the VAS server modifying the 5-tuple of the user data packet, determining whether the 5-tuple of the user data packet is modified with a rule based on whether the 5-tuple of the user data packet before modification by the VAS server can be determined according to a 5-tuple of the user data packet after modification by the VAS server;
receiving, by the VAS server information collector, request information sent by a software defined network SDN controller to request to obtain information about a VAS server connected to an SDN switch that is connected to the SDN controller, wherein the request information comprises an identifier of the SDN switch connected to the SDN controller; and
obtaining, by the VAS server information collector, VAS server information of the VAS server in the service chain from the VAS server information according to the identifier of the VAS server connected to the SDN switch and a user data packet processing manner of the VAS server; and sending the VAS server identifier of the VAS server connected to the SDN switch and the user data packet processing manner of the VAS server to the SDN controller, so that the SDN controller generates a flow table according to the user data packet processing manner of the VAS server in the service chain, the 5-tuple extracted from the user data packet, and the service chain information, and sends the flow table to the SDN switch.

9. A flow table generating apparatus, comprising:
a memory; and
a processor coupled to the memory and configured to:
obtain value-added service VAS server information sent by a VAS server information collector, wherein the VAS server information includes a VAS server identifier and a user data packet processing manner of a VAS server; and extract a 5-tuple from a user data packet and service chain information that are sent by a service-based router SBR, wherein the service chain information comprises an identifier of a VAS server in the service chain; wherein the user data packet processing manner comprises: determine whether the VAS server modifies a 5-tuple extracted from a user data packet,
in response to the VAS server modifying the 5-tuple of the user data packet, determine whether the 5-tuple of the user data packet is modified with a rule based on whether the 5-tuple of the user data packet before modification by the VAS server can be determined according to a 5-tuple of the user data packet after modification by the VAS server;
obtain VAS server information of the VAS server in the service chain from the VAS server information according to the identifier of the VAS server;
generate a flow table according to the user data packet processing manner of the VAS server in the service chain, the 5-tuple extracted from the user data packet, and the service chain information; and
send the flow table to a software defined network SDN switch.

10. The apparatus according to claim 9, wherein the processor is further configured to:
determine, according to the user data packet processing manner of the VAS server in the service chain, that a first VAS server of VAS servers in the service chain modifies the 5-tuple extracted from the user data packet and performs the modification with a rule;
obtain, according to the 5-tuple extracted from the user data packet and a user data packet processing manner of the first VAS server, a 5-tuple that is modified by the first VAS server; and
generate the flow table according to the 5-tuple extracted from the user data packet, the 5-tuple that is modified by the first VAS server, and the service chain information, wherein a match domain of the flow table is generated by the processor according to the 5-tuple that is modified by the first VAS server after the first VAS server modifies the 5-tuple extracted from the user data packet.

11. The apparatus according to claim 9, wherein the processor is further configured to:
  determine, according to the user data packet processing manner of the VAS server in the service chain, that a first VAS server modifying the 5-tuple extracted from the user data packet and performing the modification without any rule exists in the service chain;
  obtain a media access control MAC address of the first VAS server; and
  adjust the first VAS server modifying the user data packet without any rule to an end of the service chain, and generate the flow table according to the 5-tuple extracted from the user data packet, the MAC address of the first VAS server, and the service chain information, wherein after the first VAS server, a match domain of the flow table is generated by the processor according to the MAC address of the first VAS server.

12. The apparatus according to claim 11, wherein the VAS server information further comprises a MAC address of the VAS server; and the processor is further configured to:
  obtain the MAC address of the first VAS server is specifically; and
  obtain the MAC address of the first VAS server from the VAS server information obtained by the query unit by query.

13. The apparatus according to claim 11, wherein the processor is further configured to:
  query, according to an identifier of the first VAS server, a database to obtain the MAC address of the first VAS server.

14. The apparatus according to claim 9, wherein the processor is further configured to:
  determine, according to the user data packet processing manner of the VAS server in the service chain, that no VAS server modifying the 5-tuple extracted from the user data packet exists in the service chain; and
  generate the flow table according to the 5-tuple extracted from the user data packet and the service chain information.

15. The apparatus according to claim 9, wherein the processor is further configured to:
  send an identifier of the SDN switch connected to the apparatus to the VAS server information collector to request to obtain information about a VAS server connected to the SDN switch;
  obtain the VAS server information sent by the VAS server information collector; and
  obtain the information, about the VAS server connected to the SDN switch, that is sent by the VAS server information collector according to the identifier of the SDN switch.

16. A flow table generating apparatus, comprising:
  a receiver, configured to receive value-added service VAS server information reported by a VAS server, wherein the VAS server information includes a VAS server identifier, an identifier of a software defined network SDN switch connected to the VAS server, and a user data packet processing manner of the VAS server; wherein the user data packet processing manner comprises: determine whether the VAS server modifies a 5-tuple extracted from a user data packet,
  in response to the VAS server modifying the 5-tuple of the user data packet, determine whether the 5-tuple of the user data packet is modified with a rule based on whether the 5-tuple of the user data packet before modification by the VAS server can be determined according to a 5-tuple of the user data packet after modification by the VAS server; and
  receive request information sent by an SDN controller to request to obtain information about a VAS server connected to an SDN switch that is connected to the SDN controller, wherein the request information comprises an identifier of the SDN switch connected to the SDN controller;
  a processor, configured to query the VAS server information according to the identifier of the SDN switch to obtain the information about the VAS server connected to the SDN switch that is connected to the SDN controller; and
  a transmitter, configured to send the information about the VAS server connected to the SDN switch that is connected to the SDN controller, so that the SDN controller generates a flow table according to the user data packet processing manner of the VAS server in the service chain, the 5-tuple extracted from the user data packet, and the service chain information, and sends the flow table to the SDN switch.

* * * * *